Figure 1:
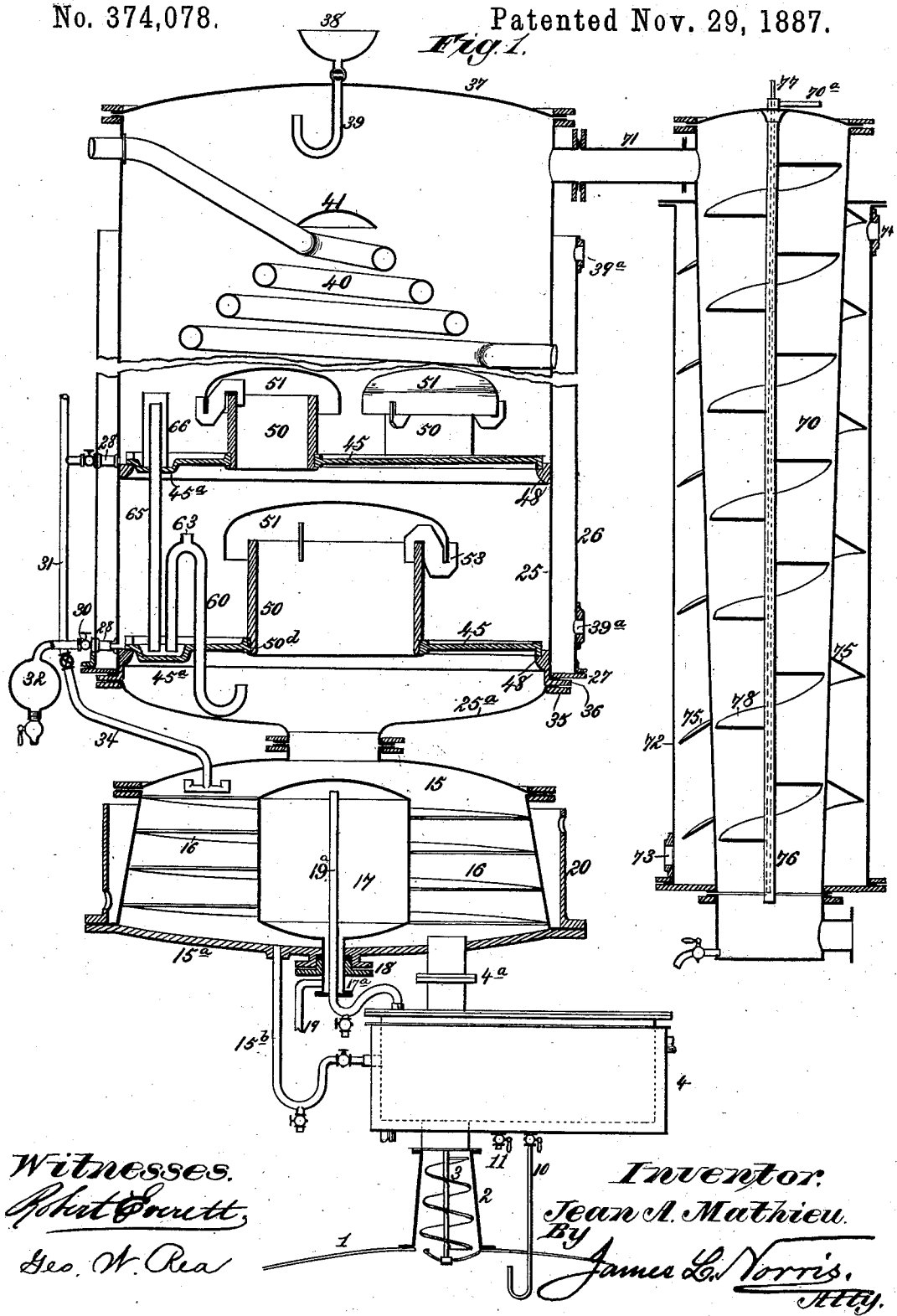

(No Model.) 3 Sheets—Sheet 1.

J. A. MATHIEU.
APPARATUS FOR SEPARATING AND PURIFYING THE PRODUCTS OF DISTILLATION OF WOOD.

No. 374,078. Patented Nov. 29, 1887.

Witnesses.
Robert Grrett,
Geo. N. Rea

Inventor:
Jean A. Mathieu.
By
James L. Norris,
Atty.

(No Model.) 3 Sheets—Sheet 2.
J. A. MATHIEU.
APPARATUS FOR SEPARATING AND PURIFYING THE PRODUCTS OF DISTILLATION OF WOOD.
No. 374,078. Patented Nov. 29, 1887.
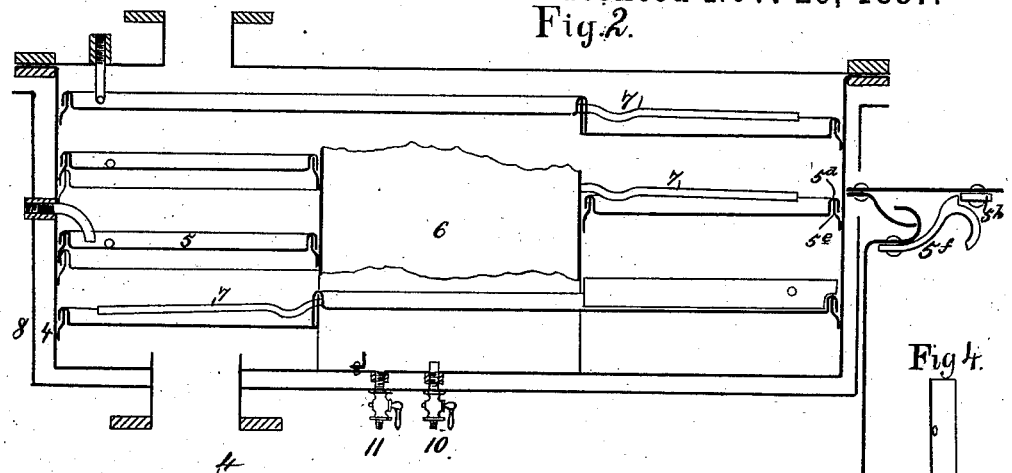
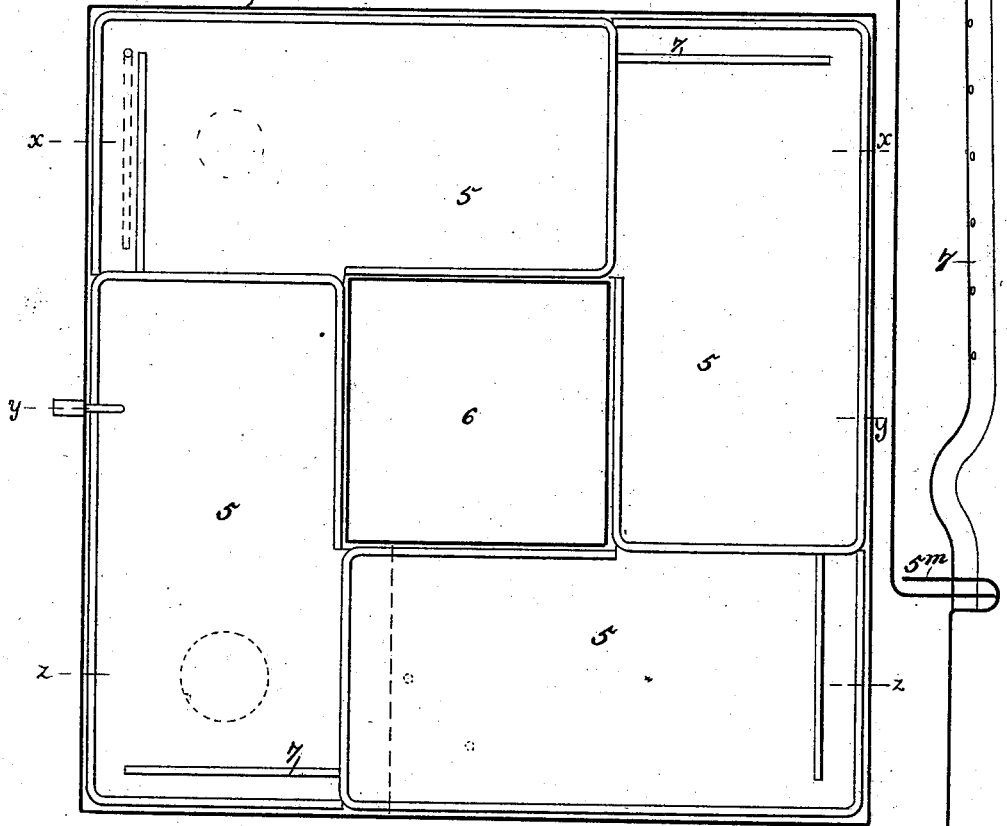
Witnesses.
Geo. H. Rea
Robert Surrett
Inventor.
Jean A. Mathieu,
By James L. Norris,
Atty.

(No Model.) 3 Sheets—Sheet 3.
J. A. MATHIEU.
APPARATUS FOR SEPARATING AND PURIFYING THE PRODUCTS OF DISTILLATION OF WOOD.
No. 374,078. Patented Nov. 29, 1887.
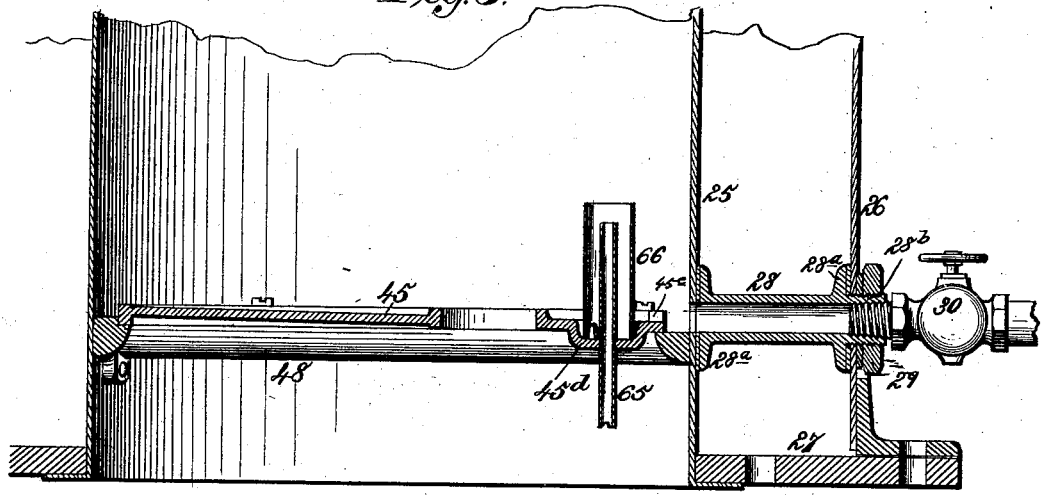
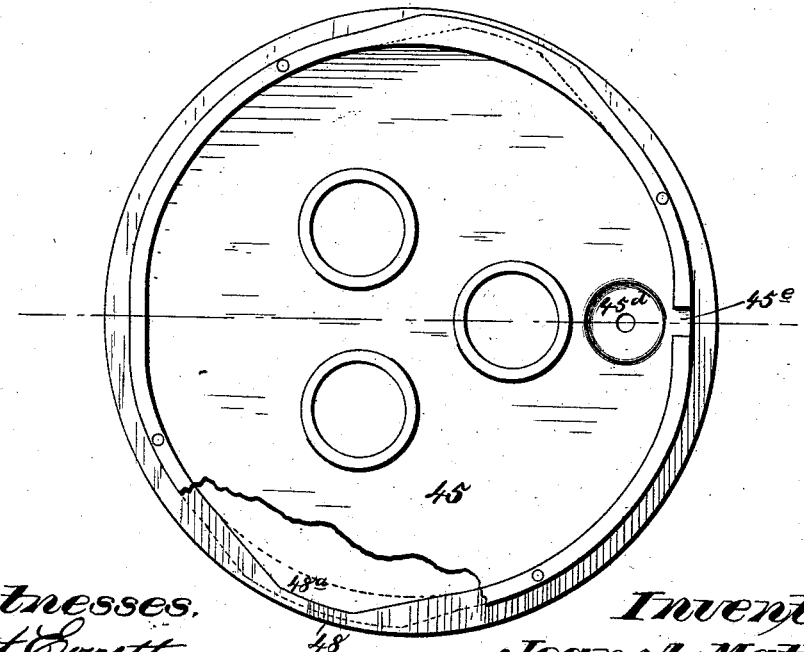

UNITED STATES PATENT OFFICE.

JEAN A. MATHIEU, OF NORTH EAST, MARYLAND.

APPARATUS FOR SEPARATING AND PURIFYING THE PRODUCTS OF DISTILLATION OF WOOD.

SPECIFICATION forming part of Letters Patent No. 374,078, dated November 29, 1887.

Application filed August 27, 1886. Serial No. 212,036. (No model.)

*To all whom it may concern:*

Be it known that I, JEAN A. MATHIEU, a citizen of the United States, residing at North East, in the county of Cecil and State of Maryland, have invented new and useful Improvements in Apparatus for Separating and Purifying the Products of Distillation of Wood, &c., of which the following is a specification.

The object of the present invention is specially to provide an apparatus for separating the products resulting from the distillation of wood; but it is also capable of purifying, separating, and condensing the volatile matters which enter into the composition of certain substances and are eliminated by means of heat. In patents heretofore issued to me—as, for example, Nos. 234,998, 208,835, and 300,383—I have shown apparatus for the same general purposes, and I disclose in said patents means for distilling wood and analogous substances.

It is to be understood that the apparatus now proposed is designed to separate and purify in a most expeditious and thorough manner the various volatile and other matters emanating from the still or resulting from the process of distillation.

In ordinary wood-distillation the products separated by my apparatus may be mentioned, first, as substances more volatile than wood-spirit of commerce; second, wood-spirit or methylic alcohol; third, formic, acetic, and propionic acids; fourth, tar or oily substances. In later processes employed by me I place crude pyroligneous acid into the still and obtain various products therefrom for further treatment; and it is the object of the present invention to provide an apparatus which is capable of carrying out any of the processes referred to.

The invention will first be fully described in connection with the drawings, and then clearly pointed out in the claims.

In the drawings, Figure 1 is a vertical sectional view of an apparatus embodying my invention. Fig. 2 is a vertical section of a separating-chamber containing superposed trays for condensed products. Fig. 3 is a plan view of the same. Fig. 4 is a detail view showing the means for supporting and holding the trays seen in Figs. 2 and 3. Fig. 5 is a vertical section of part of a concentrator, and Fig. 6 is a plan view showing the manner of shaping and supporting the inclined plates in the concentrator.

The reference-numeral 1 at bottom of Fig. 1 may designate part of an ordinary still for producing vapors and gases from wood or liquid or solid substances. These vapors or gases eliminated by means of heat ascend into a tube or chamber, 2, which contains a helix or spiral blades, 3, forming a helical or winding passage. The object of the latter is to condense the least volatile matters in the vapors passing from the still and return the same for further distillation. The helix 3 also serves to intercept all water-globules or similar matters and cause the same to go back into the still. From the chamber 2 the vapors pass into a separator comprising a casing, 4, of any desired form, which contains a series of superposed trays or pans, 5, grouped around a central water-chamber, 6, as is clearly seen in Fig. 3. These trays are placed in tiers, and every tier is formed of several trays located at different levels, so that the liquid contents passing from the last tray of one tier will enter the highest or upper tray of the next tier and flow gradually from one tray to the other toward the bottom tray.

As shown in Figs. 2 and 3, the trays of the various tiers have perforated discharge-tubes 7, which extend from a higher tray across a lower one and serve to evenly distribute the liquid over the trays. The casing 4, containing the aforesaid trays, has a surrounding jacket, 8, for forming a space for the reception or circulation of water between the casing and jacket. The central chamber, 6, also serves as a recipient for water, and contributes with the outer water-jacket to cool the contents of the chamber sufficiently to condense all substances capable of being influenced by the temperature due to the water-jacket and central water-chamber.

It is to be observed that when wood products are being distilled the substances which collect in the trays are tarry or oily matters mixed with wood-alcohol. These substances are exposed to the further heating action of the ascending vapors and such portions as are capable of being again volatilized pass out through the top of the chamber. The oil and liquid matters not vaporized by the outgoing vapors collect at the bottom of the chamber 4, and are separated according to specific gravity by two outlet-tubes, 10 and 11, terminating at different heights within the chamber. The liquid capable of being redistilled is carried back into the still by the tube 10, which has its lower end curved to form a liquid-seal. The other tube, 11, serves to discharge the oil or tar into any suitable recipient. It is understood that both tubes have suitable stop-cocks.

The trays 5 are held in position within the casing 4 by means of hook-shaped flanges 5$^d$ on the trays and interlocking flanges 5$^e$ on the casing, as is clearly seen in Figs. 2 and 4. A latch or turn-button, 5$^f$, on the tray also engages on the under side of a stop or lug, 5$^h$, on the casing and serves to hold the tray in position against the pressure of the ascending vapors. As also seen in Fig. 4, the adjacent ends of the trays are provided with reversely-turned flanges 5$^m$, so as to allow the same to be connected or interlocked.

The highly-volatile vapors discharged from the chamber 4 through the pipe 4$^a$ enter the chamber 15, which may also be termed a "separator," and ascend in a tortuous direction through a passage formed by spiral blades 16, encircling and affixed to a central drum, 17, having no connection with the interior space of the chamber 15. This drum 17 has a tube or neck, 17$^a$, which passes through a steam-tight stuffing-box, 18, at the base of the chamber 15, and the lower end of the tube 17$^a$ is closed by a cap. The latter is apertured for the passage of a vertical tube, 19$^a$, which extends to a point near the roof of the drum 17 and has a curved lower portion in communication with an inlet-opening in the casing 4, disposed directly over the uppermost tray in said chamber.

A tube, 19, enters the tube or neck 17$^a$, and serves as an inlet for liquids to be heated preparatory to distillation or volatilization in the still. It will be understood that the tube 19 is in communication with a reservoir containing liquid to be distilled, and that the drum 17 serves as a heater for the liquid entering the same, by reason of the presence of the heated vapors in the winding passage formed by the spiral blades. The heated liquid flows out at the top of the drum 17 through the tube 19$^a$ and enters the casing 4, where it descends over the trays and is again heated by the ascending vapors, and finally it passes into the still through the tube 10.

By providing means for heating liquids by means of the heat of vapors during their passage through separating-chambers, I utilize all the available heat for giving a high temperature (almost boiling-point) to the liquids fed into the still for volatilization.

The chamber or casing 15 is surrounded by a water-jacket, 20, having means for the inflow and outflow of water, and the bottom of the chamber is formed by a dished or concave plate, 15$^a$, so as to cause the matters condensed in said chamber to readily flow to the tube 15$^b$, which leads to the separator containing the trays.

Referring to Fig. 1, it will be seen that the casing 15 is a conic frustum, or is made tapering, and that the spiral plates 16 on the drum 17 bear against the inner side of said casing. The object of this formation and arrangement is to allow the spiral plates to be tightly pressed against the casing and form a close joint by moving the neck 17$^a$, with attached drum 17, up through the stuffing-box 18, as will readily be apparent.

The separator, containing the spiral blades and central drum, is connected with a so-called "concentrator," which comprises a shell or column, 25, a surrounding jacket, 26, and interior devices, hereinafter referred to. The shell 25 and jacket 26 are secured to a heavy base-flange, 27, and in the space left between the jacket and shell are arranged tubes 28, which communicate with openings in the shell and pass through the surrounding jacket. Each tube 28 has a flange, 28$^a$, against which the jacket 26 bears, and beyond said flange is formed a screw-threaded neck, 28$^b$, which passes through the jacket and receives a nut, 29, for clamping the jacket to the tube and firmly holding the latter in place. An internal screw-socket in the tube 28 serves for the reception of a valve, 30, which is connected with a vertical tube, 31. This tube 31 serves to connect all the tubes 28, which may be of any desired number, according to the height of the shell or column 25 and the number of chambers therein. A globe, 32, connected with the bottom of the tube 31 and provided with a suitable cock, serves as a medium for testing or examining the liquid entering said tube from the interior of the column 25, and in continuation of the tube 31 is another tube, 34, provided with a stop-cock. This latter tube 34 enters the separator containing the spiral passage and serves as a medium for passing the liquids condensing or accumulating in the concentrator back into the separators arranged between it and the still. It will be understood that the downflow of the liquid from the concentrator through the separators referred to will cause the heating and volatilization of such substances as are capable of being thus transformed by the ascending vapors, and, obviously, when the liquids reach the tray-separator the oil is separated by the pipe 11. The shell or casing 25 has a bottom head, 25$^a$, which converges to a neck that is attached to a neck on the separator 15, containing spiral blades. This head 25$^a$ is shown as being held between a flange, 35, and a ring-shaped support, 36, projecting into the shell 25 to form a ledge, for the object hereinafter stated.

At the top of the shell 25 is a head, 37, which is detachably held in place. A funnel, 38, at the top of a U-shaped tube, 39, is mounted on the head 37 and serves as a medium for introducing into the concentrator such chemicals or reagents as may be required for use upon the substance being treated in the apparatus.

The tube 39 serves as a liquid-seal, and it has a suitable stop-cock. The shell 25 and jacket 26 form a water-chamber, as already stated, and this chamber is provided with openings 39ª 39ª for the inflow and outflow of water. Additional means for water-cooling are also present within the concentrator. They comprise a coil of pipe, 40, arranged in the form of a cone and surmounted by a concavo-convex cap, 41, which serves as a guard for deflecting the vapors or preventing the same from passing too rapidly through the water-cooled coil. I may use several water-coils in the same chamber, according to the requirements of the work.

The concentrator, in addition to the devices specified, contains superposed inclined shelves 45, which are supported in such a manner that they divide the concentrator into a series of compartments communicating with each other. These shelves 45 are present in any desired number, according to the height of the column or requirements of the case. The lowermost shelf is supported upon the ring 36, above referred to, and the other shelves rest upon rings or ledges 48, riveted to the shell 25. The shelves are secured to the supporting-ledges by bolts or other fastening devices. In order to allow these shelves to be readily introduced and removed, I make them and the supporting-rings of peculiar shape.

Referring to Fig. 6, it will be seen that the plate constituting the shelf approximates an oval shape and that cuts or recesses 48ª are made in the supporting-rings. These cuts are diametrically opposite each other and permit the shelves to be introduced into place by holding them edgewise, after which they are turned so as to rest upon the supporting-rings. It will be understood that the oval shape of the shelf will permit the entire series of the same to be readily inserted and removed, since it is apparent that the lower shelves can readily be passed through and beyond the supporting-rings of the upper shelves. Each shelf is made with an inclined surface, so as to allow liquid to flow thereon from one side of the column or shell to the other. This inclination of the shelf is clearly seen in Fig. 5. An aperture or apertures made in the shelf serve, for the reception of one or more vertical open-ended tubes, 50, which form the communication from one chamber to the other. These tubes have a bottom shoulder, 50ᵈ, which rests on a rim surrounding the aperture in the plate, so that each one will be perfectly true and the tops held at the same level. Each tube is held in place by riveting its lower end, and on the upper end is a cap, 51, which is hung in such a way as to be perfectly level in relation to the top of the tube, as shown in Fig. 1. I support the cap by an S-shaped holder, 53, which fits on the edge of the tube 50 and receives the lower edge of the cap. These holders 53 are cut from metal, and being all alike the caps can be hung perfectly true in every instance.

Each shelf is provided with a pocket or well, 45ᵈ, at its lowermost point, and in line with said well is a groove, 45ᵉ, which communicates with a gutter formed by the supporting-ring beneath the rims of the shell 25. This gutter may be inclined like the shelf by making the supporting-ring higher at one point than at the other. The gutter thus formed communicates with the outlet-openings in the shell for returning the liquid accumulating in the concentrator to the still whenever desired. In practice, or during the perfect working of the apparatus, the liquid condensing in the concentrator is preserved on a level with the tops of the tubes on the inclined shelves, and hence the caps are caused to dip into such liquid; hence it follows that the ascending vapors or volatile products must after passing through the tube of an inclined plate descend through the liquid, which naturally results in a condensation of such products as are capable of being condensed. When the liquid rises above the top of the tube in the inclined shelf, it can flow out through a tube, 60, from one chamber to the other, and eventually such overflow-liquid goes through the separators into the still. The tube 60, (seen in the lower chamber of the concentrators) dips into the well 45ª in the inclined plate and extends on a level with the top of the tube 50, and then it extends through the inclined plate and is curved upwardly at its lower end. At the upper bend of such tube 60 is an opening or nipple, 63, which is slightly higher than the top of the tube 50, so as to cause an outflow of the liquid when it rises too high. The oil or other liquid of greater specific gravity than the liquid which would flow out through the opening 63 collects in the well 45ª and flows out through the tube 60, the ascent and expulsion of the oil being effected by the pressure of the superincumbent liquid. In the upper chamber of the concentrator is shown another form of oil discharge and overflow device. It comprises a straight tube, 65, extending through the oil-well 45ᵈ in one shelf into the liquid of the chamber below. The upper end of this tube is surrounded by a tube, 66, which extends to the same level as has been stated in reference to the opening 63, and its bottom rests upon the inclined plate and is cut out thereat; hence it follows that the oil can enter through the cuts in the tube 66 and ascend by fluid-pressure into the space between the two tubes and pass out through the tubes 65 into the lower chamber, to be from thence taken to the place of final discharge. The products, still in a volatilized state, after having passed through the various separators and concentrator, are conducted into a condenser which comprises a shell or casing, 70, of a cylindrical or conical shape, closed at the top and bottom by caps and communicating at the top with the concentrator by a pipe, 71, and at the bottom with a suitable receiver for the final product, resulting in consequence of the separation and concentration of less volatile products by passage through the above-mentioned separators and concentrator. Several condensers may also be used, in which event the bottom outlet of one connects with the top inlet of the other.

The casing 70 is surrounded by a cylinder or jacket, 72, and a water-chamber is formed between the two, and openings 73 74 are provided for the inflow and outflow of water. Spiral plates 75, arranged around the outer surface of the casing 70, form a winding passage for the water, and the upward flow of the latter is thus retarded, so as to utilize the full cooling power of the same. Within the casing 70 is arranged a vertical tube, 76, which is closed at the bottom and terminates near the base of the chamber 70. This tube 76 incloses another smaller tube, 77, which is open at the bottom and communicates with a water-supply source at the top, so that water can be admitted through said tube to the bottom of the water-tube and caused to flow in an upward direction in order to be discharged through an outlet, 70, at the top of the outer tube. The latter is surrounded by spiral blades 78, which form a helical passage in order to effect a perfect condensation of the vapors entering the condenser and descending through the helical or winding passage. It is apparent that in my condenser there is an upward flow of water around and within a chamber in which the condensation is effected, and in which the matters condensed flow in a downward direction.

In order to facilitate the cleaning of the condenser, I mount the water-tube with spiral plates on the cap of the condenser-chamber, so that by moving said cap the parts attached to it can be withdrawn from the condenser chamber. Instead of the construction shown I may employ a series of vapor-tubes, as in my patent No. 300,383, and locate spiral wings inside the same for causing the vapors to traverse a spiral passage for insuring a perfect condensation.

I desire it to be understood that I do not confine myself to the precise construction and combination of devices herein set forth, since various modifications can be made in the construction without departing from the spirit of my invention. Furthermore, it is not necessary that the various separators, concentrator, and condenser be relatively arranged or grouped as herein shown, since these devices can be multiplied either singly or collectively, some omitted altogether, or others used in connection with any form of distilling apparatus with which they are capable of being combined.

What I claim is—

1. In an apparatus for separating and condensing vapors, the combination, with the vapor-discharge pipe of a still, of a helical or spiral intercepter for watery globules, a separator having a series of trays communicating with each other, and a condenser, substantially as herein set forth.

2. In an apparatus for separating and condensing vapors, the combination, with a still, of a separator comprising a series of trays or pans arranged in tiers and having the trays of each tier arranged at different levels and communicating with each other, a central water-chamber surrounded by said trays, and outlet-tubes for liquids of different specific gravity, substantially as herein set forth.

3. In an apparatus for separating and condensing vapors, the combination of the casing having flanges or hooks, the trays having corresponding hooks, the buttons and stops for holding the trays in place, and vapor inlet and outlet means, substantially as herein set forth.

4. In an apparatus for separating and condensing vapors, the combination of the concentrator, comprising the water-cooled chamber, the inclined shelves having tubes, the caps for the same, and the discharge-tubes for condensed matters, with a still and a condenser, substantially as herein set forth.

5. A concentrator for vapors, consisting of a casing or chamber having interior ledges or supports, the inclined shelves having cap-surmounted tubes, a well or depression, and liquid-outflow tubes, substantially as herein set forth.

6. A concentrator for vapors, comprising a casing or chamber, the interior ledges or rings provided with cuts, and the oval shelves having means for the inflow of vapors and outflow of liquids, substantially as herein set forth.

7. A concentrator for vapors, having inclined shelves, discharge-apertures for liquid at the lower ends of said shelves, the stop-cocks communicating with said apertures, and a test-bulb with stop-cock connected with the pipe, substantially as herein set forth.

8. A concentrator for vapors, consisting of the casing or chamber having inclined shelves provided with cap-surmounted tubes, the outer water-jacket, the tubes with screw-necks and nuts for holding the jacket to the casing, the outer discharge-tube, and means for the inflow and outflow of vapors into the concentrator, substantially as herein set forth.

9. A concentrator consisting of the casing or chamber, the inclined plates having wells or depressions, and the tubes for withdrawing liquid from said wells, substantially as herein set forth.

10. In an apparatus for separating and condensing vapors, the combination, with a still and condenser, of a concentrator having chambers formed by inclined shelves, the cap-surmounted tubes on said shelves, the vapor inlet and outlet pipes, and the tubes for removing the liquid collecting on the inclined plates, substantially as herein set forth.

11. A concentrator for vapors, comprising a jacketed casing, interior inclined plates having cap-surmounted tubes and forming superposed chambers, and an upper coil or coils adapted for the passage of water, substantially as herein set forth.

12. A condenser for vapors, comprising a passage having spiral plates forming a winding course for the vapors, and means for the circulation of a cooling medium, substantially as herein set forth.

13. In an apparatus for separating and condensing vapors, the combination, with a still, of a helical separator for watery globules, &c., a separator having a series of trays, a separator having a spiral passage for vapors and central drum with inlet and outlet pipes for liquid, a concentrator provided with inclined plates, and a condenser, substantially as herein set forth.

14. A separator for vapors, consisting of a tapering shell, a bottom plate having a stuffing-box, an interior drum carrying spiral plates and provided with a neck passing through the stuffing-box, whereby said spiral plates can be forced against the cone-shaped shell for obtaining a tight joint between the plates and shell, substantially as herein set forth.

In testimony whereof I affix my signature in presence of two witnesses.

JEAN A. MATHIEU.

Witnesses:
AUG. M. TANNER,
J. A. RUTHERFORD.